(12) United States Patent
Varga

(10) Patent No.: US 9,747,532 B1
(45) Date of Patent: Aug. 29, 2017

(54) MULTI-LEVEL PROTECTOR COAT BITMAP GENERATION FOR PRINTING SYSTEMS

(71) Applicant: John Thomas Varga, Longmont, CO (US)

(72) Inventor: John Thomas Varga, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/213,169

(22) Filed: Jul. 18, 2016

(51) Int. Cl.
| | |
|---|---|
| *G06K 15/10* | (2006.01) |
| *G06K 15/02* | (2006.01) |
| *H04N 1/40* | (2006.01) |
| *H04N 1/405* | (2006.01) |
| *B41J 2/21* | (2006.01) |
| *H04N 1/46* | (2006.01) |

(52) U.S. Cl.
CPC .............. *G06K 15/102* (2013.01); *B41J 2/21* (2013.01); *B41J 2/2107* (2013.01); *B41J 2/2114* (2013.01); *G06K 15/1832* (2013.01); *G06K 15/1889* (2013.01); *H04N 1/40* (2013.01); *H04N 1/405* (2013.01); *H04N 1/46* (2013.01)

(58) Field of Classification Search
CPC ...................................... B41J 2/2114
See application file for complete search history.

(56) References Cited

U.S. PATENT DOCUMENTS

| | | | |
|---|---|---|---|
| 7,140,709 B2 | 11/2006 | Couwenhoven et al. | |
| 7,196,714 B2 | 3/2007 | Someno | |
| 7,210,753 B2 | 5/2007 | Couwenhoven et al. | |
| 7,236,734 B2 | 6/2007 | Ng et al. | |
| 7,497,540 B2 | 3/2009 | Mizutani et al. | |
| 7,672,474 B2 | 3/2010 | Nakamura et al. | |
| 7,777,758 B2 | 8/2010 | Yhann et al. | |
| 8,130,413 B1 | 3/2012 | Pellore | |
| 8,208,827 B2 | 6/2012 | Sakata | |
| 8,218,155 B2 | 7/2012 | Kovacs | |
| 8,608,272 B2 | 12/2013 | Lang | |
| 8,615,182 B2 | 12/2013 | Ikeda | |

(Continued)

OTHER PUBLICATIONS

U.S. Appl. No. 15/053,187: Protector Coat Bitmap Generation for Printing Systems; John Thomas Varga, Entire document.

(Continued)

*Primary Examiner* — Shelby Fidler
(74) *Attorney, Agent, or Firm* — Duft Bornsen & Fettig LLP

(57) ABSTRACT

An application of clear protectant to a printable medium is described that allows for different amounts of protectant to be applied to the medium based on the amounts of colorant that is applied to the medium. Colorant bitmaps are analyzed to calculate an amount of colorant coverage for a medium. Printable features in the colorant bitmaps are replicated into different intermediate protectant bitmaps based on the colorant coverage for the printable features, where the intermediate protectant bitmaps specify different amounts of protectant to apply. Features in the intermediate bitmaps are expanded and replicated into a final protectant bitmap. A determination is made for the amount of protectant to apply to the medium that is based on the different amounts specified by the intermediate bitmaps.

20 Claims, 18 Drawing Sheets

(56) References Cited

U.S. PATENT DOCUMENTS

| | | | |
|---|---|---|---|
| 8,619,335 B2 | 12/2013 | Matsunaga | |
| 2009/0153613 A1* | 6/2009 | Yamanobe | B41M 5/0017 347/21 |
| 2011/0222126 A1 | 9/2011 | Asai et al. | |
| 2013/0120482 A1* | 5/2013 | Nishikawa | B41J 2/2114 347/9 |
| 2014/0168672 A1 | 6/2014 | Haruta | |
| 2014/0240789 A1* | 8/2014 | Panek | B41J 2/2114 358/3.26 |
| 2015/0110535 A1* | 4/2015 | Kogusuri | G03G 15/6585 399/341 |

OTHER PUBLICATIONS

OKI Printing with White and Clear Toner on the OKI C941dn; 2014 OKI Data Americas, Inc., Entire document.

* cited by examiner

FIG. 3
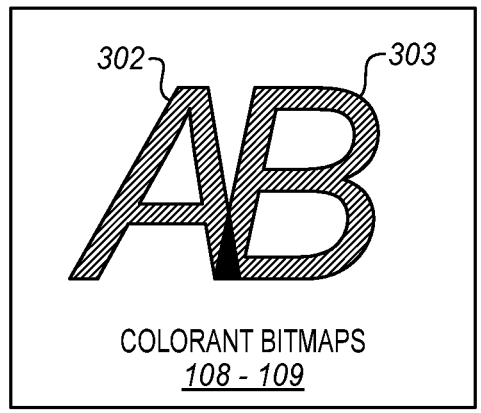
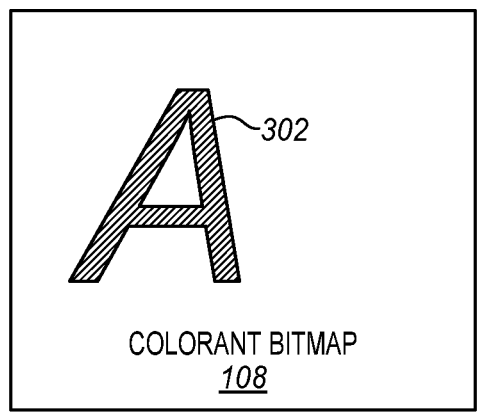
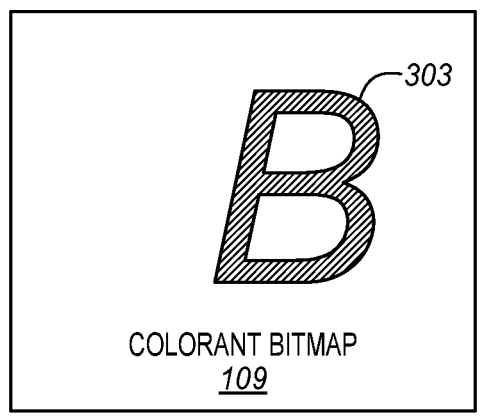

FIG. 5
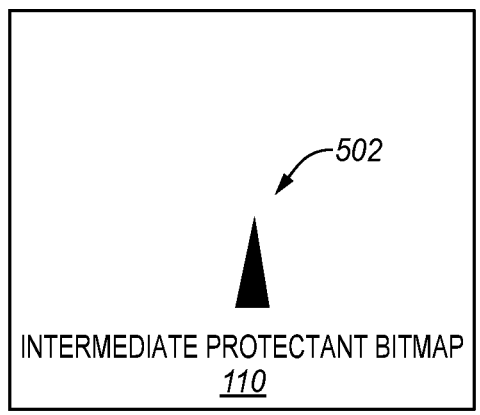
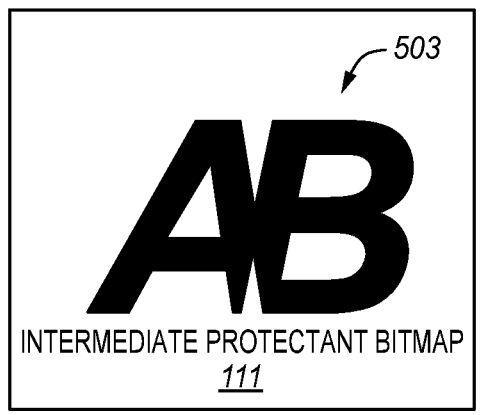

MULTI-LEVEL PROTECTOR COAT BITMAP GENERATION FOR PRINTING SYSTEMS

FIELD

This disclosure relates to the field of printing systems, and in particular, to printing systems that apply clear protectant overcoats.

BACKGROUND

Ink jet printing systems mark a printable medium by propelling droplets of ink onto the medium. Although a number of variations exist in the types of ink jet printing systems that are in use, the two main types of ink jet printing systems are Drop-On-Demand (DOD) printing systems and continuous ejection printing systems. DOD printing systems utilize heating elements or piezoelectric elements within ink ejection nozzles to propel ink on demand onto the medium. Continuous ejection printing systems utilize a continuous stream of ink and electrostatic fields to control the placement of the ink onto the medium.

In some cases, it may be desirable to apply a clear protectant to the ink features that have been marked to the medium. For example, the protectant may be used with water-soluble inks to prevent the ink from smearing or otherwise being affected by water. Applying the protectant is performed after the inked images are applied to the medium. For example, the protectant may be applied over the inked portions of the medium at a location in the print path that is downstream of the ink marking process.

The protectant is a consumable resource in a printing system and an expense in the printing process that is factored into the costs associated with the printing process. Typically the protectant is applied to the entire page or sheet of a job. However, applying the protectant in this manner can be wasteful, since inked features on the medium rarely encompass the entire page or sheet on the medium.

SUMMARY

Embodiments described herein provide targeted application of a clear protectant to print features marked onto a printable medium utilizing a multi-level protector coat bitmap that allows for different amounts of protectant to be applied to the medium based on the amounts of colorant that is applied to the medium.

One embodiment comprises a controller for a printing system that receives colorant bitmaps that define printable features for a medium, calculates a colorant coverage for the medium based on the colorant bitmaps, and replicates the printable features from the colorant bitmaps having a colorant coverage higher than a threshold to a first protectant bitmap to generate first protectant features, where the first protectant bitmap specifies a first amount of the clear protectant to apply to the medium. The controller replicates the printable features from the colorant bitmaps having a colorant coverage that is lower than the threshold to a second protectant bitmap to generate second protectant features, where the second protectant bitmap specifies a second amount of the clear protectant to apply to the medium that is different than the first amount. The controller expands boundaries of the first and second protectant features to generate expanded first and second protectant features, replicates the expanded first and second protectant features to a final protectant bitmap, and determines an amount of the clear protectant to specify for the expanded first protectant features in the final protectant bitmap that is based on the first and second amounts specified in the first and second protectant bitmaps. The controller directs print heads of the printing system to apply colorants to the medium to form the printable features on the medium based on the colorant bitmaps, and directs a print head of the printing system to apply the clear protectant to the printable features formed on the medium based on the final protectant bitmap.

Another embodiment comprises a method for providing targeted application of a clear protectant to print features marked onto a printable medium utilizing a multi-level protector coat bitmap. The method comprises receiving colorant bitmaps that define printable features for a medium, calculating a colorant coverage for the medium based on the colorant bitmaps, and replicating the printable features from the colorant bitmaps having a colorant coverage higher than a threshold to a first protectant bitmap to generate first protectant features, where the first protectant bitmap specifies a first amount of the clear protectant to apply to the medium. The method further comprises replicating the printable features from the colorant bitmaps having a colorant coverage that is lower than the threshold to a second protectant bitmap to define second protectant features, where the second protectant bitmap specifies a second amount of the clear protectant to apply to the medium that is different than the first amount, and expanding boundaries of the first and second protectant features in the first and second protectant bitmaps where the clear protectant is applied to the medium to generate expanded first and second protectant features. The method further comprises replicating the expanded first and second protectant features to a final protectant bitmap, and determining an amount of the clear protectant to specify for the final protectant bitmap for the expanded first protectant feature that is based on the first and second amounts specified in the first and second protectant bitmaps. The method further comprises directing print heads of the printing system to apply colorants to the medium to form the printable features on the medium based on the colorant bitmaps, and directing a print head of the printing system to apply the clear protectant to the printable features formed on the medium based on the final protectant bitmap.

Another embodiment comprises a non-transitory computer readable medium embodying programmed instructions which, when executed by a processor of a printing system, direct the processor to receive colorant bitmaps that define printable features for a medium, calculate a colorant coverage for the medium based on the colorant bitmaps, and replicate the printable features from the colorant bitmaps having a colorant coverage higher than a threshold to a first protectant bitmap to generate first protectant features, wherein the first protectant bitmap specifies a first amount of the clear protectant to apply to the medium. The instructions further direct the processor to replicate the printable features from the colorant bitmaps having a colorant coverage that is lower than the threshold to a second protectant bitmap to generate second protectant features, wherein the second protectant bitmap specifies a second amount of the clear protectant to apply to the medium that is different than the first amount, and to expand boundaries of the first and second protectant features in the first and second protectant bitmaps to generate expanded first and second protectant features. The instructions further direct the processor to replicate the expanded first and second protectant features to a final protectant bitmap, and to determine an amount of the clear protectant to specify for the final protectant bitmap for the expanded first protectant features that is based on the first and second amounts specified in the first and second protectant bitmaps. The instructions further direct the processor to direct print heads of the printing system to apply colorants to the medium to form the printable features on the medium based on the colorant bitmaps, and to direct a print head of the printing system to apply the clear protectant to the printable features formed on the medium based on the final protectant bitmap.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

FIG. 3 illustrates printable features as indicated by colorant bitmaps in an exemplary embodiment.

FIG. 5 illustrates expanded protectant features in response to expanding the boundaries of the protectant features of FIG. 4 in an exemplary embodiment.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
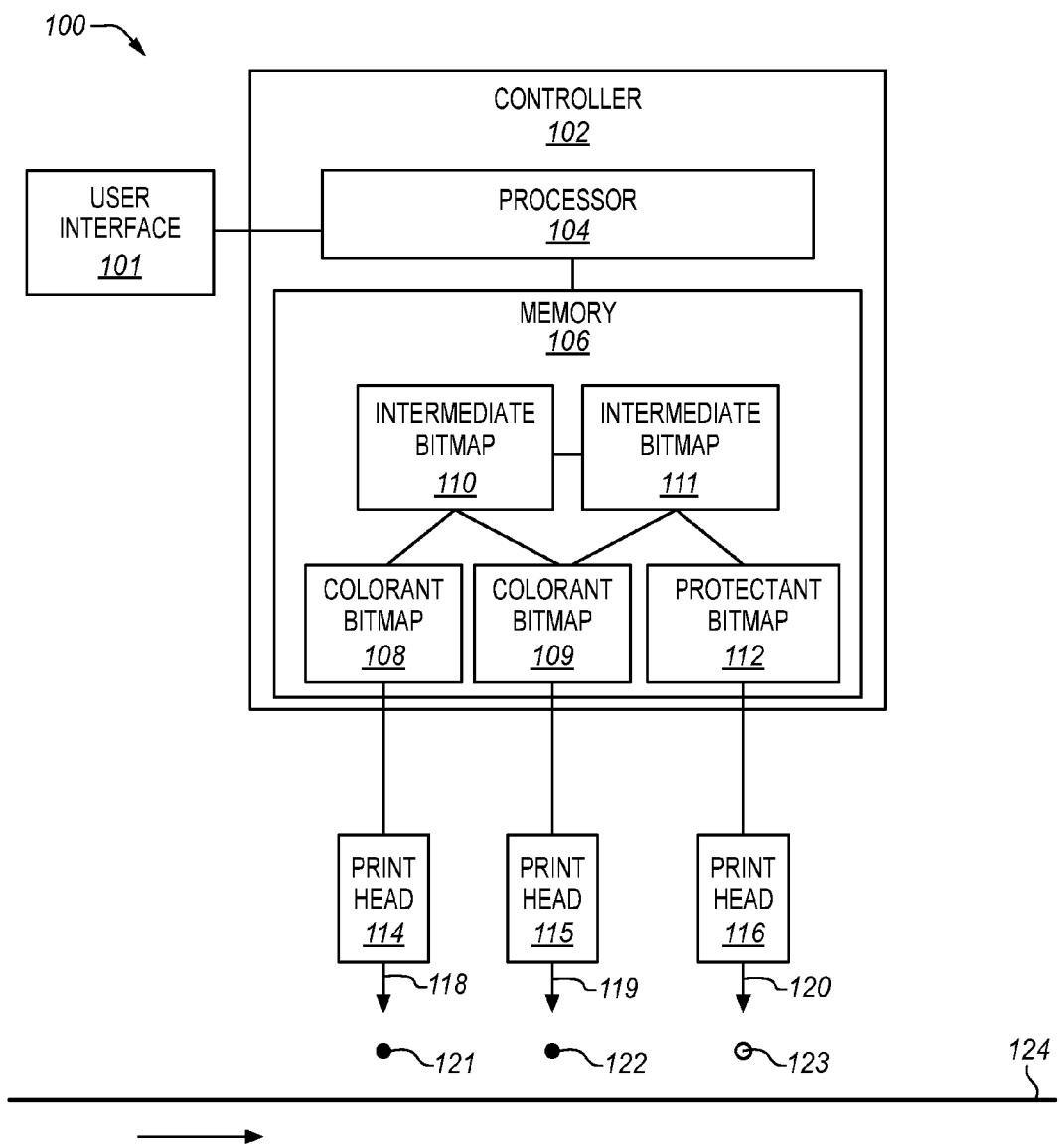
FIG. 1 is block diagram of a printing system in an exemplary embodiment.

FIG. 1 is block diagram of a printing system 100 in an exemplary embodiment. In this embodiment, printing system 100 includes a controller 102 that comprises any component, system, or device that is able to coordinate the printing activities for printing system 100. For instance, controller 102 may create, store, and modify bitmaps that are used during the printing process, such as bitmaps used to control the application of a clear protectant onto a medium. Controller 102 may also be referred to as a Digital Front End (DFE).

In this embodiment, controller 102 includes one or more processors 104 that are communicatively coupled to a memory 106. Memory 106 stores colorant bitmaps 108-109, which indicates printable features for a medium 124. Medium 124 may include any printable substrates, including paper, metal, plastic, textiles, fabric, glass, wood, etc. Some examples of printable features include text, line art, images, graphics, etc. Colorant bitmaps 108-109 may be generated by processor 104 during a printing process. For instance, processor 104 may generate raster images of print data, which are used by print heads to control the application of ink onto a printable medium. Colorant bitmaps 108-109 may also be referred to as color plane data. For instance, colorant bitmaps 108-109 may comprise Cyan (C) Magenta (M), Yellow (Y), Key black (K) color plane data. Each of the C, M, Y, and K color planes are used to control the application of different colorants onto a print media. For example, a printing system may utilize a different print head to dispense each of the C, M, Y, and K colors onto a print media, with each print head separately controlled by a different plane of color data. Although only two colorant bitmaps 108-109 are illustrated for controller 102, controller 102 may utilize any number of two or more colorant bitmaps to implement the embodiments described herein. One skilled in the art will recognize that the use of two colorant bitmaps 108-109 in the following discussion is merely for the purpose of brevity.

In this embodiment, printing system 100 includes colorant print heads 114-115 that are able to dispense drops of colorants 121-122 utilizing nozzles 118-119. For instance, colorant print heads 114-115 may comprise separate heads for each of the C, M, Y, K colorants that may be marked to medium 124 by printing system 100. Although only two colorant print heads 114-115 are illustrated for printing system 100 for dispensing colorants, system 100 may utilize any number of colorant print heads to implement the embodiments described herein. One skilled in the art will recognize that the use of two colorant print heads 114-115 for dispensing colorants in the following discussion is merely for the purpose of brevity.

Colorants 121-122 may comprise ink, paint, or other materials that are capable of marking medium 124. Colorant print heads 114-115 comprises any component, system, or device that are able to mark medium 124 with colorants 121-122. Colorants 121-122 are ejected from nozzles 118-119 by colorant print heads 114-115 based on colorant bitmaps 108-109, and strike medium 124.

In this embodiment, memory 106 also stores intermediate protectant bitmaps 110-111 that are processed during operation of controller 102 to generate a final protectant bitmap 112. Intermediate protectant bitmaps 110-111 will be discussed later.

A protectant print head 116 of printing system 100 dispenses a clear protectant 123 from one or more nozzles 120 onto medium 124 based on final protectant bitmap 112. Protectant print head 116 comprises any component, system, or device that is able to mark medium 124 with protectant 123. Although only one nozzle 120 is illustrated for protectant print head 116, protectant print head 116 may include any number of nozzles 120 that are each capable of dispensing drops of protectant 123 onto medium 124. Protectant 123 is used as an overlay by printing system 100, and is applied onto the printable features marked to medium 124 by colorant print heads 114-115. In this embodiment, medium 124 moves in the direction of the arrow illustrated in FIG. 1, although in some embodiments, colorant print heads 114-115 and/or protectant print head 116 may move relative to medium 124. Protectant 123 may be used by printing system 100 to prevent the smearing of printable features that have been applied to medium 124 by colorant print heads 114-115. For instance, if colorants 121-122 are water soluble, then protectant 123 may be applied to colorants 121-122 that are applied to medium 124 to prevent water from impacting the print quality of the print job. In other cases, protectant 123 may be a material to provide desirable surface gloss finish properties (e.g., matte, satin, semi-gloss, gloss, or textured), or a material that provides protection from light (e.g., protection against fading from ultraviolet light).

In this embodiment, printing system 100 further includes a user interface 101. User interface 101 comprises any component, system, or device that is able to receive information from a user, and to present information to the user. Some examples of user interface 101 include a keyboard, a mouse, a display, and combinations thereof.

While the specific hardware implementation of controller 102 is subject to design choices, one particular embodiment may include one or more processors 104 communicatively coupled with memory 106. Processor 104 includes any electronic circuits and/or optical circuits that are able to perform functions. For example, processor 104 may perform any functionality described herein for controller 102. Processor 104 may include one or more Central Processing Units (CPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc.

Memory 106 includes any electronic circuits, and/or optical circuits, and/or magnetic circuits that are able to store data. For instance, memory 106 may be used to store bitmaps (e.g. colorant bitmaps 108-109, intermediate protectant bitmaps 110-111, and/or final protectant bitmap 112). Memory 106 may include one or more volatile or non-volatile Dynamic Random Access Memory (DRAM) devices, FLASH devices, volatile or non-volatile Static RAM devices, magnetic disk drives, Solid State Disks (SSDs), etc. Some examples of non-volatile DRAM and SRAM include battery-backed DRAM and battery-backed SRAM.

When printing system 100 is operational and configured to apply a protective coating to a print media, a process may be performed to generate bitmap data that is used to apply the protective coating. As discussed previously, it is desirable to apply protectant 123 to print medium 124 to ensure that regions of medium 124 that are marked with colorants 121-122 do not smear or otherwise reduce the quality of the printed output generated by printing system 100. However, it is also desirable to reduce the amount of protectant 123 that is used by printing system 100. One possibility for reducing the amount of protectant 123 is to apply protectant 123 to areas on medium 124 that are marked with colorant, in contrast to applying protectant 123 to medium 124 as a whole. Another possibility for reducing the amount of protectant 123 is to apply protectant 123 differently across medium 124 depending on the total amount of colorants applied at different areas of medium 124. For instance, if a pel or a pixel location on medium 124 indicates 400% CMYK colorant coverage, it may be desirable to apply more protectant 123 to that particular pel or pixel location while applying less protectant 123 to pel or pixel locations that have a lower (e.g., 100% CMYK) colorant coverage. Generally, more protectant 123 may be needed for marked areas on medium 124 that have a higher colorant coverage than for marked areas on medium 124 that have a lower colorant coverage. Thus, it would be wasteful to simply apply protectant 123 across the marked areas of medium 124 at some maximum application amount, when it is clear that less protectant 123 could be applied to marked areas of medium 124 that have a lower colorant coverage. The following embodiments and their related discussion are intended to address how to minimize the amount of protectant 123 that is used during a printing process.

Figure 2:
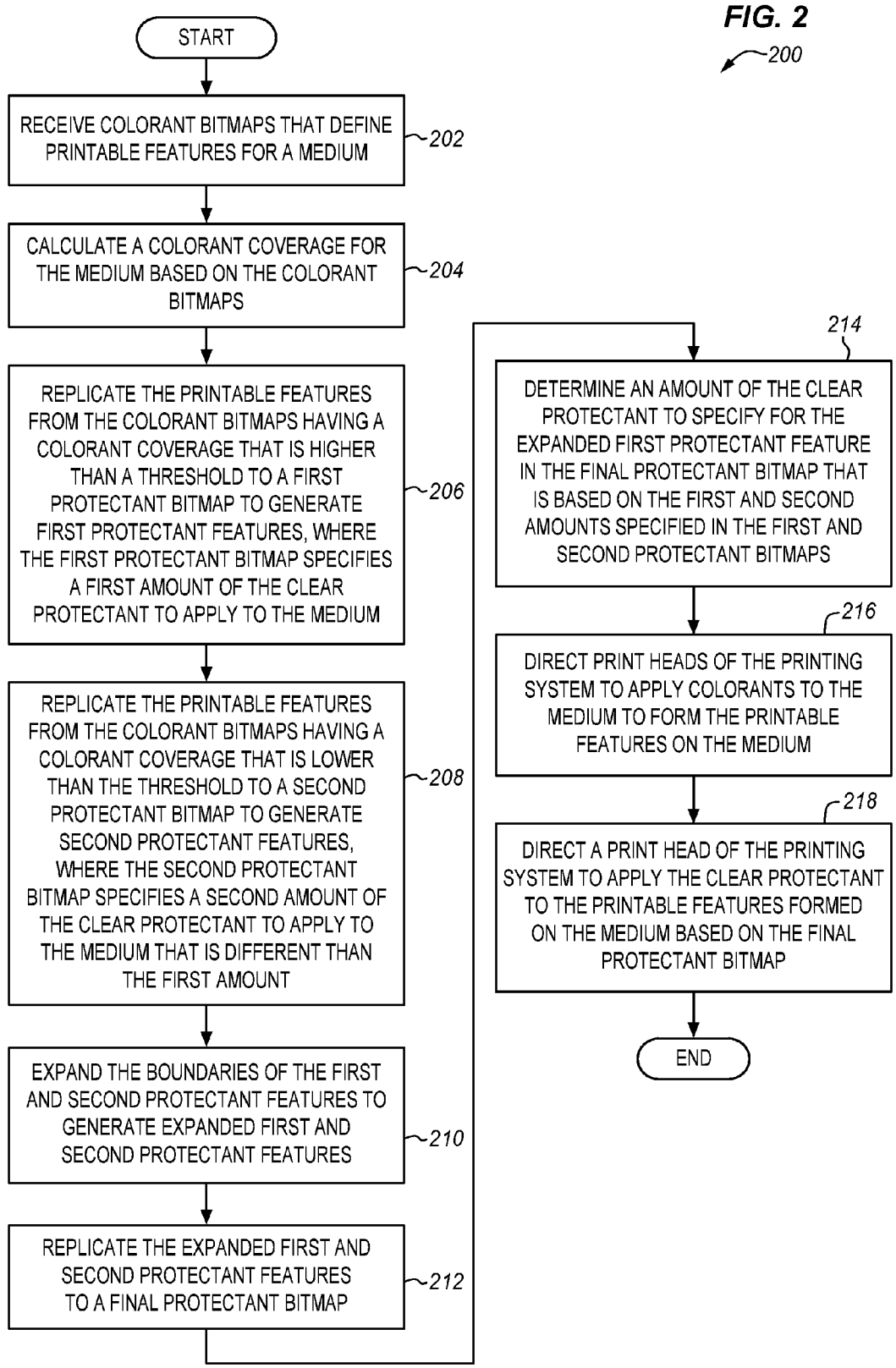
FIG. 2 is a flow chart of a method for applying a protective coating onto a printable medium in an exemplary embodiment.

FIG. 2 is a flow chart of a method 200 for applying a protective coating onto a printable medium in an exemplary embodiment. Method 200 will be discussed with respect to printing system 100 of FIG. 1, although method 200 may be performed by other systems, not shown. The steps of the flow charts described herein may include other steps that are not shown. Also, the steps of the flow charts described herein may be performed in an alternate order.

Processor 104 receives colorant bitmaps 108-109 that indicates printable features for medium 124 (see step 202). FIG. 3 illustrates printable features 302-303 as indicated by colorant bitmaps 108-109 in an exemplary embodiment. As discuss previously, colorant bitmaps 108-109 are used by colorant print heads 114-115 to control the application of colorants 121-122 applied to medium 124. For instance, colorant bitmaps 108-109 may comprise arrays of pel or pixel data values that are used to control the application of colorants 121-122 by nozzles 118-119. In some embodiments, the pixel values may be simple binary, with a zero or one value being used by colorant print heads 114-115 to turn on or off the application of colorants 121-122 at nozzles 118-119. In other embodiments, the pixel values may comprise multi-bit values, which are used by colorant print heads 114-115 to turn on, off, and to vary an amount of colorants 121-122 ejected by nozzles 118-119. In this embodiment, printable feature 302 comprises the text letter "A" and printable feature 303 comprises the text letter "B", although in other embodiments, printable features 302-303 may comprise line art, graphics, pictures, etc. In this embodiment, colorant bitmap 108 represents printable feature 302, which is used by colorant print head 114 to control the application of colorant 121 onto medium 124 by nozzle 118. In this embodiment, colorant bitmap 109 represents printable feature 303, which is used by colorant print head 115 to control the application of colorant 122 onto medium 124 by nozzle 119. However, one skilled in the art will recognize that printable features 302-303 may be derived from multiple colorant bitmaps and therefore, printable features 302-303 may use multiple colorants. The particular relationship between printable feature 302 and colorant 121, and printable feature 303 and colorant 122 is merely for purposes of discussion.

Processor 104 calculates a colorant coverage amount for medium 124 based on colorant bitmaps 108-109 (see step 204). To do so, processor 104 may analyze colorant bitmaps 108-109 on a pixel or pel basis to determine an amount of colorant that will be applied to medium 124 during a printing process. For instance, the colorant coverage for each pixel in colorant bitmaps 108-109 may depend on the amount of colorants 121-122 that will be applied to medium 124 at a particular pixel location, which may depend upon the aggregate or sum of the colorant(s) applied to that particular pixel location. For a CMYK printing system, any particular pixel location may comprise varying amounts of C, M, Y, or K colorants, within the range of 0% (CMYK each=0) to 400% (CMYK each=100%). Therefore, it is possible for any particular pixel or pel location, when marked to medium 124, to have a wide variation in the total amount of colorants that will be applied.

Figure 4:
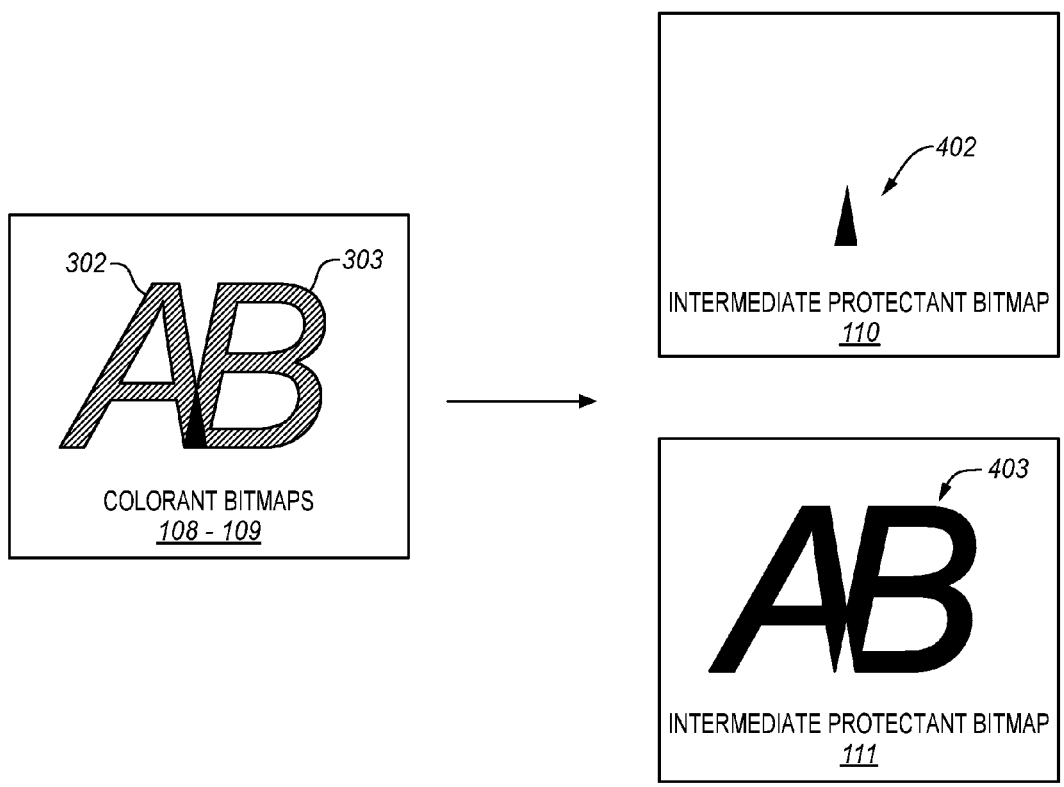
FIG. 4 illustrates the result of replicating the printable features in colorant bitmaps in an exemplary embodiment.

Processor 104 replicates printable features 302-303 from colorant bitmaps 108-109 having a colorant coverage that is higher than a threshold to intermediate protectant bitmap 110 to generate first protectant features (see step 206), and replicates printable features 302-303 from colorant bitmaps 108-109 having a colorant coverage that is lower than the threshold to intermediate protectant bitmap 111 to generate second protectant features (see step 208). FIG. 4 illustrates the result of replicating the printable features in colorant bitmaps 108-109 in an exemplary embodiment. In this embodiment, intermediate protectant bitmap 110 stores a first protectant feature 402, which is a small triangle shaped feature formed from where printable features 302-303 overlap. When overlap occurs, it is possible that some portions of the aggregate of colorant bitmaps 108-109 have a colorant coverage that is above the threshold. For instance, if printable feature 302 specifies that the amount of colorant 121 to apply to medium 124 is x, and printable feature 303 specifies that the amount of colorant 122 to apply to medium 124 is y, then it is possible that for some portions of colorant bitmaps 108-109 where printable features 302-303 overlap to have an aggregated colorant coverage x+y that is greater than the threshold used to determine how printable features 302-303 are replicated into intermediate protectant bitmaps 110-111. Also in this embodiment, intermediate protectant bitmap 111 stores a second protectant feature 403, which is similar to printable features 302-302.

In this embodiment, intermediate protectant bitmaps 110-111 specify that different amounts of protectant 123 are to be applied to medium 124. For instance, intermediate protectant bitmap 110 may specify a higher amount of protectant 123 to apply since protectant feature 402 is derived from the printable features in colorant bitmaps 108-109 that have a higher colorant coverage (e.g., due to the thresholding process of step 206). Intermediate protectant bitmap 111 may specify a lower amount of protectant 123 to apply since protectant feature 403 is derived from the printable features in colorant bitmaps 108-109 that have a lower colorant coverage (e.g., due to the thresholding process of step 208). Intermediate protectant bitmaps 110-111 may comprise single bit or multi-bit bitmaps as desired to specify the different amounts of protectant 123 to apply to medium 124.

In response to performing the thresholding and replication process that is performed on colorant bitmaps 108-110, processor 104 expands the boundaries of protectant features 402-403 in intermediate protectant bitmaps 110-111 where protectant 123 is applied to medium 124 to generate expanded protectant features (see step 210).

Figure 6:
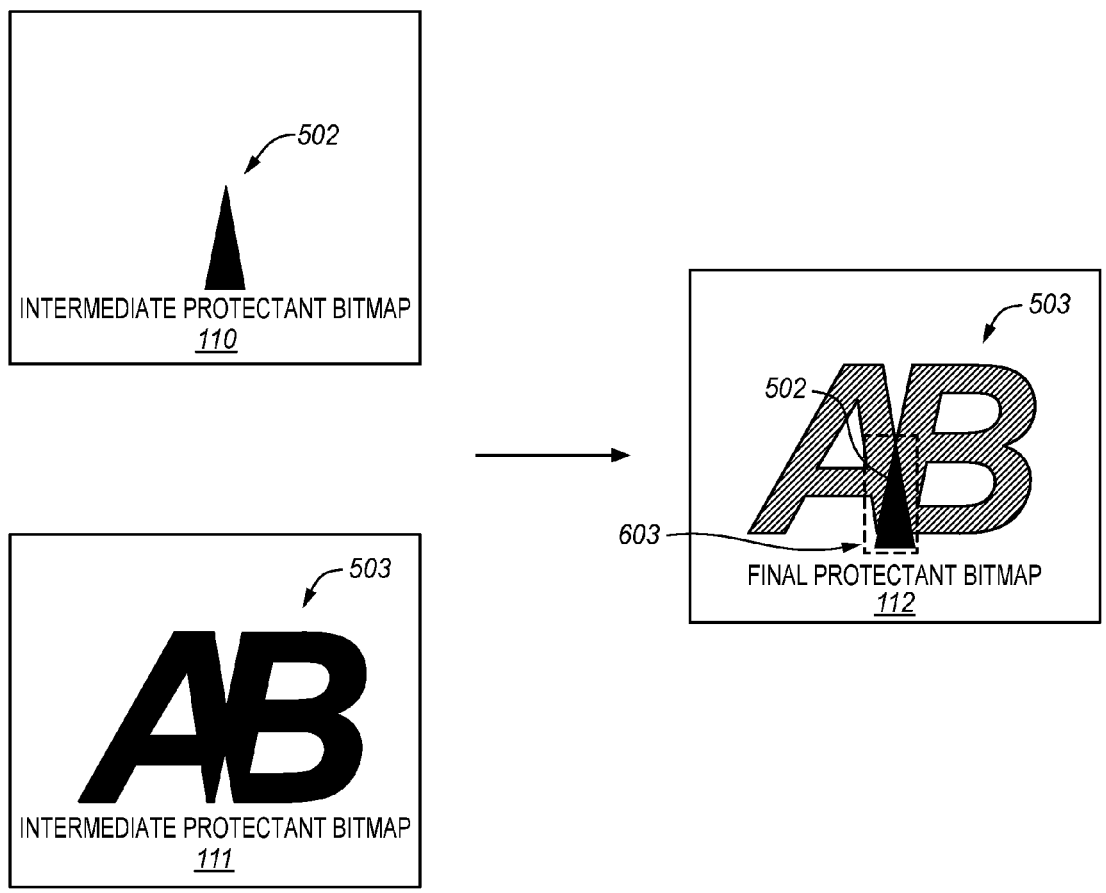
FIG. 6 illustrates the expanded protectant features of FIG. 5 replicated to a final protectant bitmap in an exemplary embodiment.

FIG. 5 illustrates expanded protectant features 502-503 in response to expanding the boundaries of protectant features 402-403 of FIG. 4 in an exemplary embodiment. Processor 104 replicates expanded protectant features 502-503 from intermediate protectant bitmaps 110-111 to final protectant bitmap 112 (see step 212). Final protectant bitmap 112 in this embodiment comprises a multi-level bitmap (e.g., each pel or pixel location comprises a multi-bit value) to enable different amounts of protectant to be applied to medium 124. FIG. 6 illustrates expanded protectant features 502-503 replicated to final protectant bitmap 112 in an exemplary embodiment. Processor 104 determines an amount of protectant 123 to specify for expanded protectant feature 502 in final protectant bitmap 112 that is based on the amounts specified in protectant bitmaps 110-111 (see step 214). For instance, processor 104 may select a higher of the different amounts specified by intermediate protectant bitmaps 110-111 or may select a lower of the different amounts specified by intermediate protectant bitmaps 110-111. Depending on the desired results, medium 124, colorant 121-122 and/or protectant 123 characteristics, various algorithms for determining protectant 123 amount applied to medium 124 can be supported (e.g., protectant 123 amount to apply to medium 124 is proportional or inversely proportional to the colorant coverage underneath). Processor 104 may specify an amount of protectant 123 for expanded protectant features 503 in final protectant bitmap 112 that is based on the amount defined by intermediate bitmap 111, and may specify a different amount of protectant 123 for expanded protectant feature 502 in final protectant bitmap 112 that is based on the amount defined by intermediate protectant bitmap 110. Final protectant bitmap 112 in FIG. 6 therefore illustrates a protectant amount that is based on the colorant coverage for medium 124.

Figure 7:
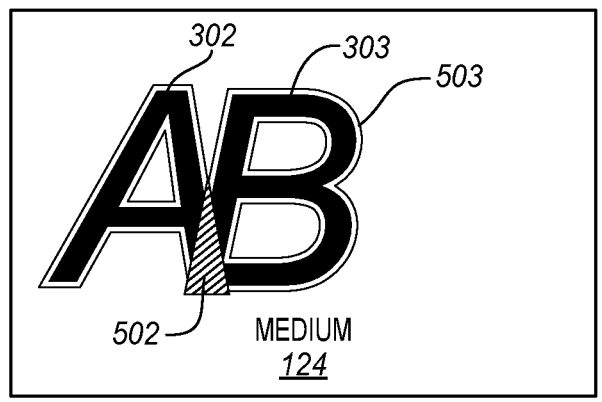
FIG. 7 illustrates printable features marked to a medium with colorants and a protectant in an exemplary embodiment.

Processor 104 directs colorant print heads 114-115 to apply colorants 121-122 to medium 124 to form printable features 302-303 (see FIG. 3) based on colorant bitmaps 108-109 (see step 216). Processor 104 directs protectant print head 116 to apply protectant 123 to printable features 302-303 formed on medium 124 based on bitmap 112. FIG. 7 illustrates printable features 302-303 marked to medium 124 with colorants 121-122, expanded protectant features 502 marked with a first protectant 123 amount, and expanded protectant feature 503 marked with a second protectant 123 amount in an exemplary embodiment.

Using expanded boundaries for the application of protectant 123 can provide a number of advantages to printing system 100. For instance, if protectant 123 were applied over the entire surface of medium 124, then more protectant 123 would be used during the printing process than is necessary. If protectant 123 were applied over printable features 302-303 without expansion, then a registration mismatch between colorant print heads 114-115 and protectant print head 116 may result in portions of printable features 302-303 not being covered by protectant 123. The result in this case is that smearing or other print quality problems may arise. A registration mismatch may occur between colorant print heads 114-115 and protectant print head 116 due to variations in the position of medium 124, as medium 124 traverses between colorant print heads 114-115 and protectant print head 116.

Figure 8:
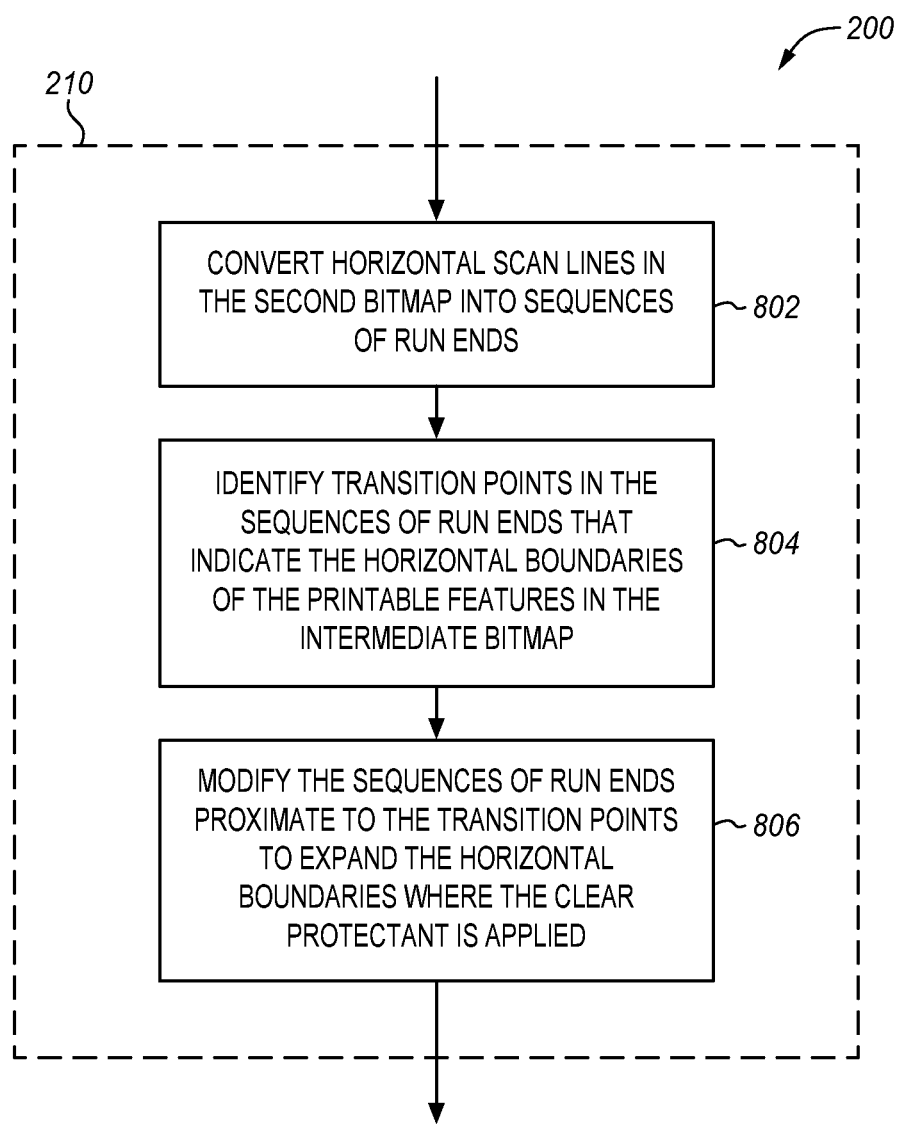
FIG. 8 is a flow chart of additional details of the method of FIG. 2 for a horizontal scan line expansion in an exemplary embodiment.

FIG. 8 is a flow chart of additional details of method 200 for performing a horizontal expansion of protectant features 402-403 in intermediate protectant bitmaps 110-111 in an exemplary embodiment. FIG. 8 will be discussed with respect to protectant feature 402 defined by intermediate protectant bitmap 110, although the additional details of FIG. 8 may apply equally to protectant feature 403 defined by intermediate protectant bitmap 111.

In order to locate a boundary of protectant feature 402 in intermediate protectant bitmap 110 along a horizontal axis, processor 104 first converts horizontal scan lines in intermediate protectant bitmap 110 sequences of run ends (see step 802). The run ends format is a variation of run length encoding. Run length encoding relies on the observation that images typically include adjacent pixels that share the same color. This is referred to as a run. Typically a run is described as a color and the number of following pixels that share that color. Run length encoding reduces the amount of data that is used to represent an image.

The run ends format is a specialized form of run length encoding that assumes a 1-bit image. In this case, there are two possible colors present in a 1-bit image. One color is white (no protectant applied, which corresponds to blank pixel) and the other color is black (protectant applied, which corresponds to non-blank pixel). For instance, if intermediate protectant bitmap 110 a 1-bit representation of how protectant 123 is applied to medium 124, then the run ends format would be an efficient way to represent whether a particular pixel location in intermediate protectant bitmap 110 indicates whether protectant 123 is applied to medium 124. Since there are only two possible colors, the actual colors are not stored for each run. Instead, the colors are inferred from the previous run. In the run ends format, a 1-bit image is encoded as a collection of run ends sequences, one sequence for each scan line in the image.

Figure 9:
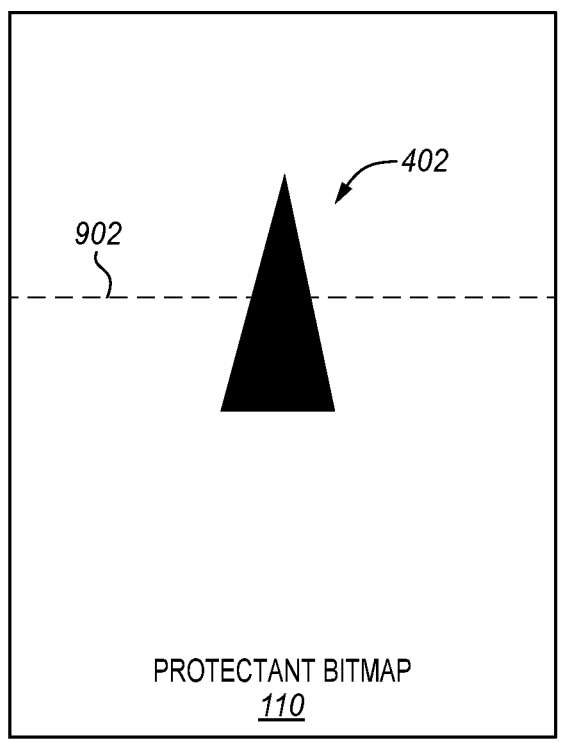
FIG. 9 illustrates a horizontal scan line that traverses across an intermediate protectant bitmap in an exemplary embodiment.

Since most scan lines have more white runs than black runs, some variations in the run ends format assume that an image scan line starts with a white run (at run 0). Processor 104 identifies transition points in the sequences that indicate the horizontal boundaries of the protectant features in intermediate protectant bitmap 110 (see step 804). FIG. 9 illustrates horizontal scan line 902 that traverses across intermediate protectant bitmap 110 in an exemplary embodiment. Horizontal scan line 902 is just one scan line of a plurality of horizontal scan lines that may be processed for intermediate protectant bitmap 110. In this embodiment, horizontal scan line 902 traverses horizontally across protectant feature 402.

Figure 10:
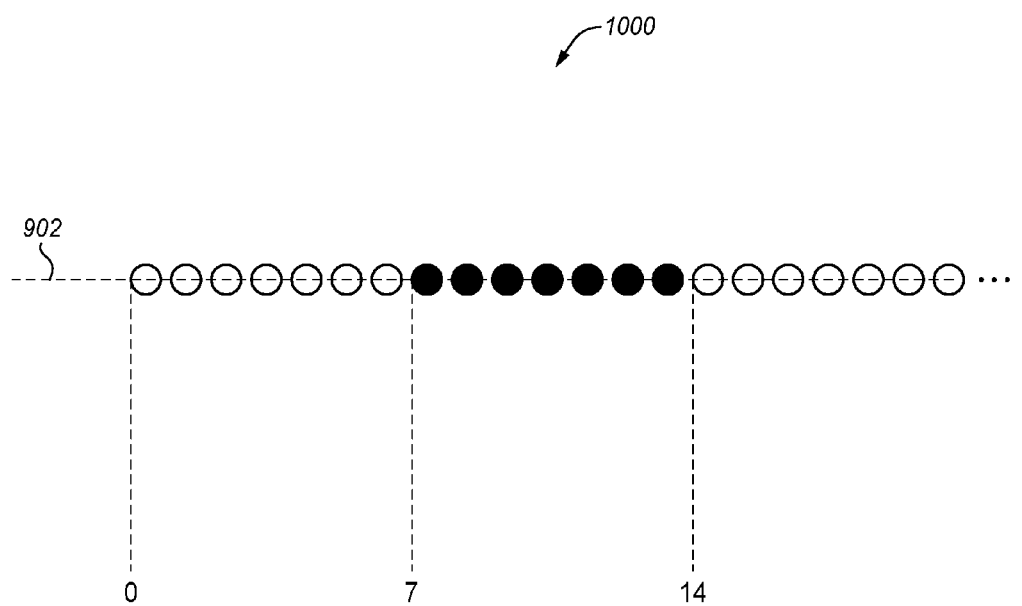
FIG. 10 illustrates a number of pixels along the horizontal scan line of FIG. 9 in an exemplary embodiment.

FIG. 10 illustrates a number of pixels 1000 along horizontal scan line 902 in an exemplary embodiment. Pixels that are clear indicate that protectant 123 will not be applied to medium 124 at a particular nozzle 120 of protectant print head 116, and pixels that are dark indicate that protectant 123 will be applied to medium 124 at a particular nozzle 120 of protectant print head 116.

In FIG. 10, the transition points occur where pixels 1000 transition between clear and dark. In the run ends format, the sequence of transitions may be [7, 14], as illustrated in FIG. 10. However, additional numbers may be present in the sequence depending on the particular implementation of the run ends format.

In this embodiment, processor 104 can directly identify the transition points in scan line 902 based on the sequence. For example, the number seven in the sequence allows processor 104 to identify a run of seven white pixels in scan line 902, while the number fourteen in the sequence allows processor 104 to identify a subsequent run of seven black pixels that follow the white run of seven white pixels.

Figure 11:
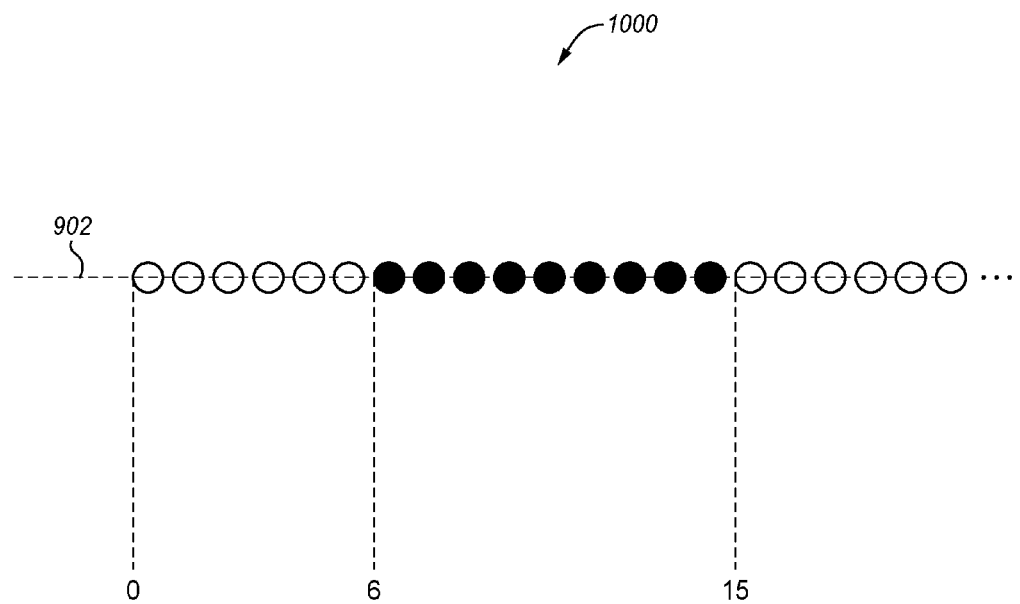
FIG. 11 illustrates how the sequence illustrated in FIG. 10 has been modified proximate to the transition points in an exemplary embodiment.

In response to identifying the transition points in the run ends sequence, processor 104 modifies the sequence proximate to the transition points to expand the horizontal boundaries where the protectant 123 is applied to medium 124 (see step 806). FIG. 11 illustrates how the sequence has been modified proximate to the transition points in an exemplary embodiment. In the run ends format, the modified sequence of transitions points is now [6, 15], corresponding to a one pixel expansion where protectant 123 will be applied to medium 124. Although FIG. 11 illustrates a 1 pixel expansion, any number may be expanded as desired to vary the amount of horizontal expansion of protectant feature 403. For instance, processor 104 may be programmed to shift the transition points in the sequence by a pre-determined number of pixel locations (e.g., 10) to expand the boundaries where protectant 123 is applied to medium 124. In some embodiments, a user may utilize user interface 101 to select the pre-determined number of pixel locations for expansion. This allows the user to vary the horizontal expansion as desired. If a two pixel expansion is desired, then sequence [7, 14] becomes [5, 16]. A three pixel expansion results in a sequence of [4, 17].

Figure 12:
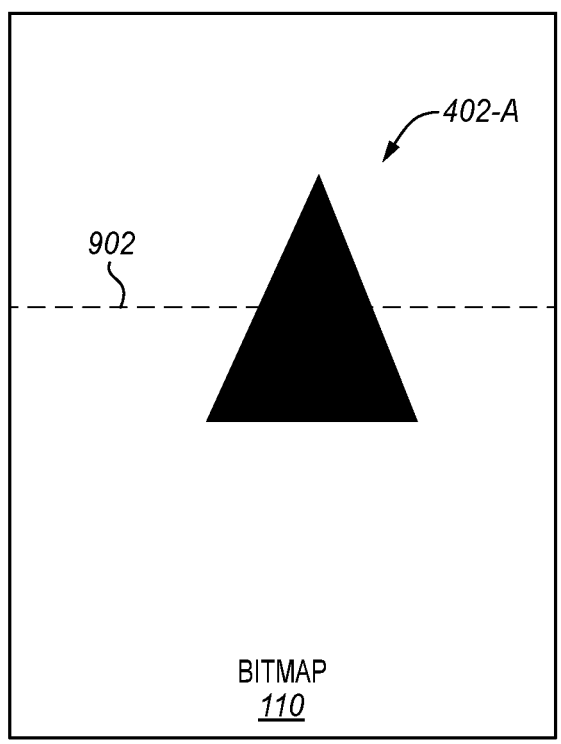
FIG. 12 illustrates intermediate expansion of a printable feature after a horizontal scan line expansion in an exemplary embodiment.

This process may be repeated for any number of horizontal scan lines in intermediate protectant bitmap 110. FIG. 12 illustrates intermediate expansion of protectant feature 402 after a horizontal scan line expansion in an exemplary embodiment. After the horizontal expansion process, the boundaries of intermediate expansion 402-A in the horizontal axis are expanded as compared to protectant feature 402. However, the vertical boundaries are the same. The vertical boundary can be expanded as well using a number of different techniques. One technique is to rotate intermediate bitmap 110 and to re-process intermediate bitmap 110 as per the steps described for FIG. 8. For instance, intermediate protectant bitmap 110 may be rotated and another horizontal scan line expansion pass may be performed on the rotated version of intermediate protectant bitmap 110. After the expansion, intermediate protectant bitmap 110 is rotated back to the normal position.

Figure 13:
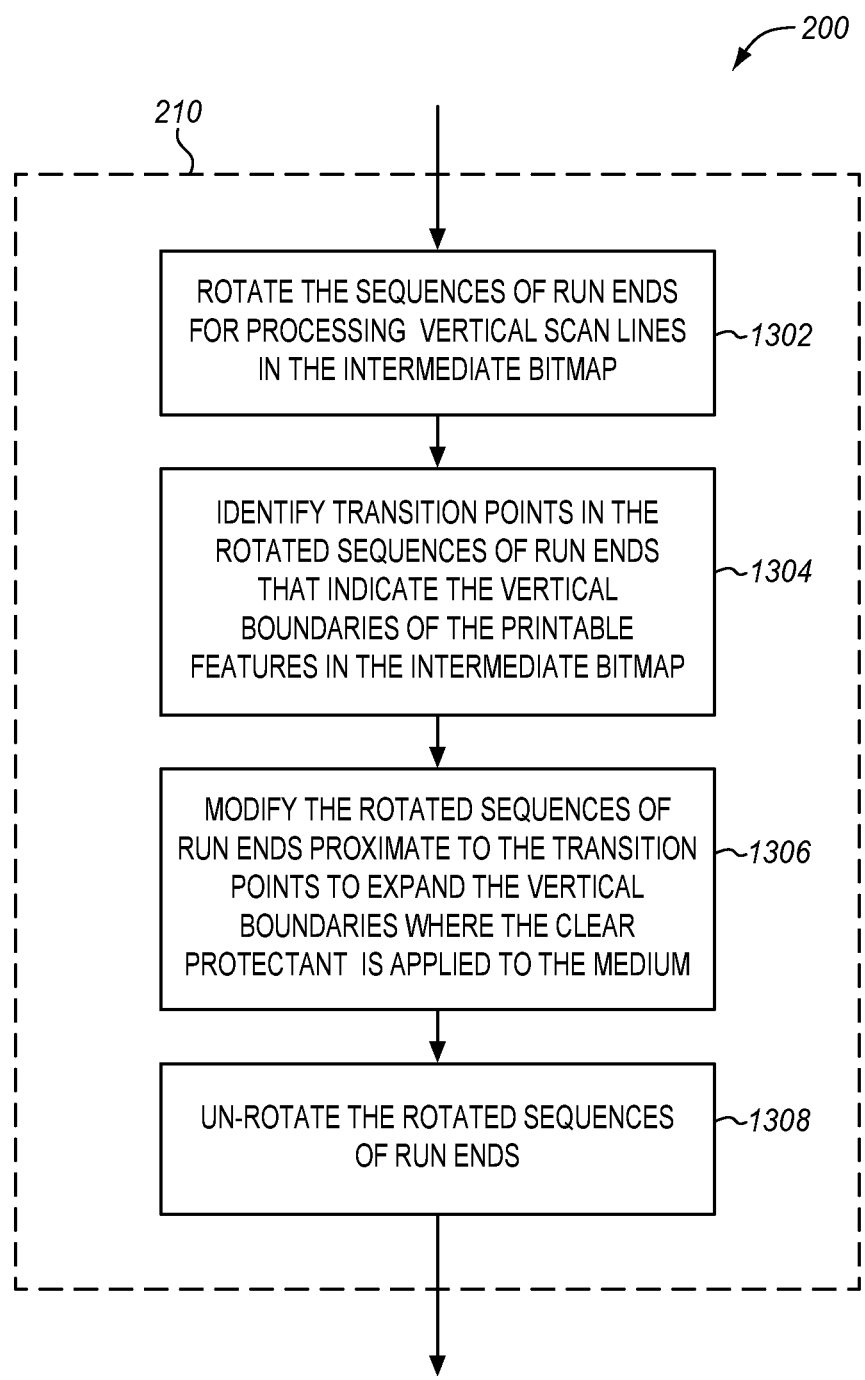
FIG. 13 is a flow chart of additional details of the method of FIG. 2 for a vertical scan line expansion in an exemplary embodiment.
Figure 14:
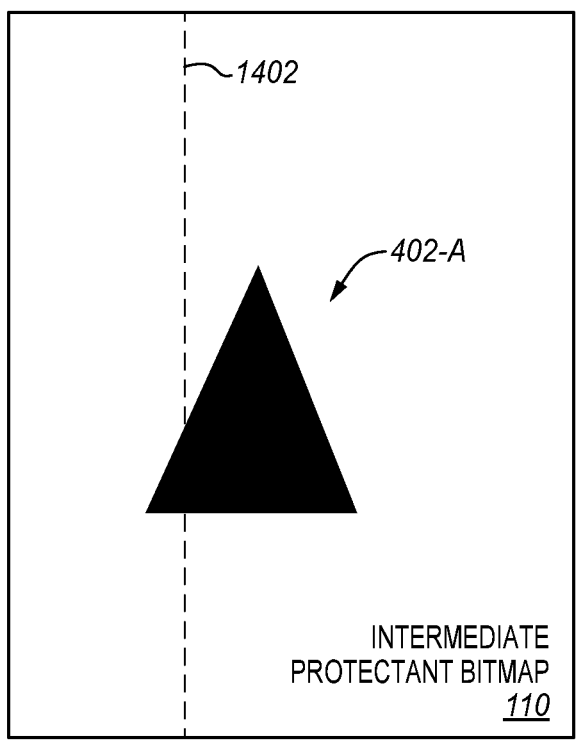
FIG. 14 illustrates a vertical scan line that traverses across an intermediate protectant bitmap in an exemplary embodiment.
Figure 18:
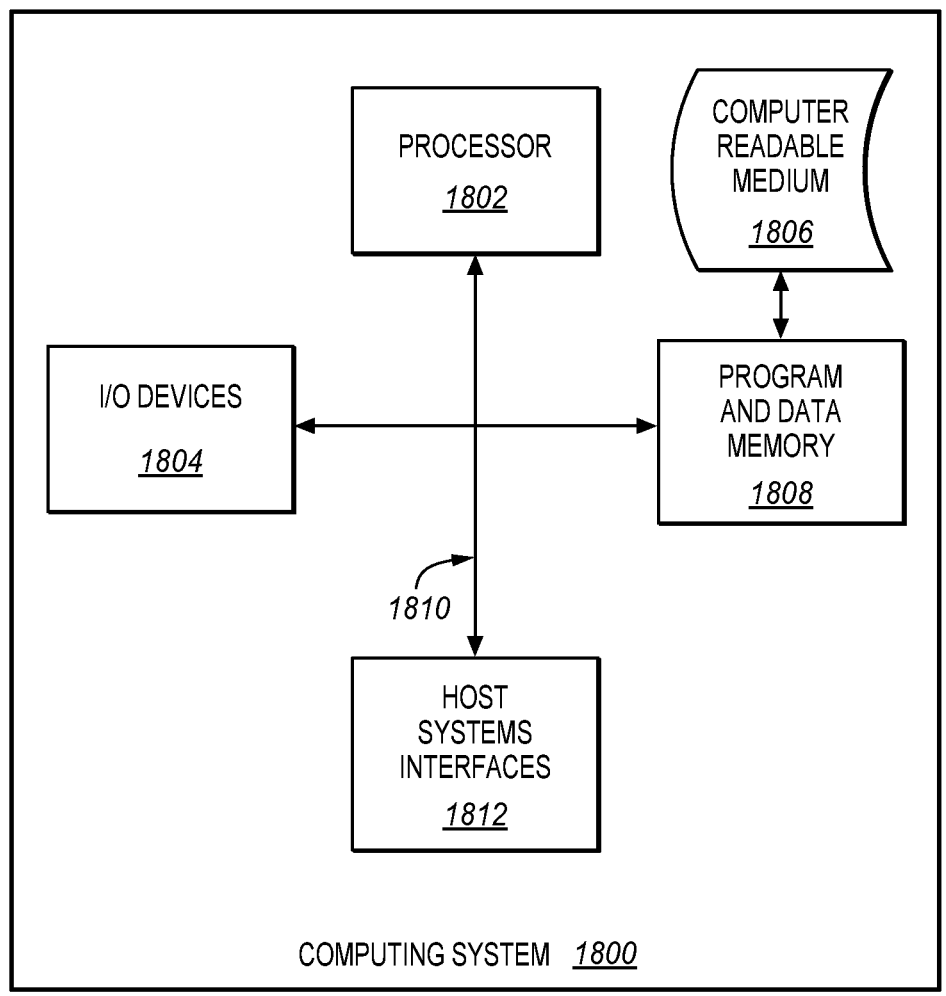
FIG. 18 illustrates a computing system in which a computer readable medium may provide instructions for performing any of the functionality disclosed herein for a controller of the printing system of FIG. 1.

FIG. 13 is a flow chart of additional details of method 200 for a generating a vertical expansion of the printable features in intermediate protectant bitmap 110 in an exemplary embodiment. FIG. 18 will be discussed with respect to protectant feature 402 defined by intermediate protectant bitmap 110, although the additional details of FIG. 13 may apply equally to protectant feature 403 defined by intermediate protectant bitmap 111. FIG. 14 illustrates a vertical scan line 1402 that traverses across intermediate protectant bitmap 110 in an exemplary embodiment. Vertical scan line 1402 is just one scan line of a plurality of vertical scan lines that may be processed for intermediate protectant bitmap 110. In this embodiment, vertical scan line 1402 traverses vertically across the protectant feature 402-A. In order to locate the boundary of protectant feature 402-A in intermediate protectant bitmap 110 along a vertical axis, processor 104 rotates the sequences of run ends (see step 1302). Those familiar with the run end compression formats will recognize that there are various processes not described herein that can efficiently rotate run end sequences within various run end formats without incurring a performance penalty of decompressing the run end sequences into bitmaps prior to rotation. For instance, a transpose operation may be performed on the run ends sequences to rotate the sequences.

Figure 15:
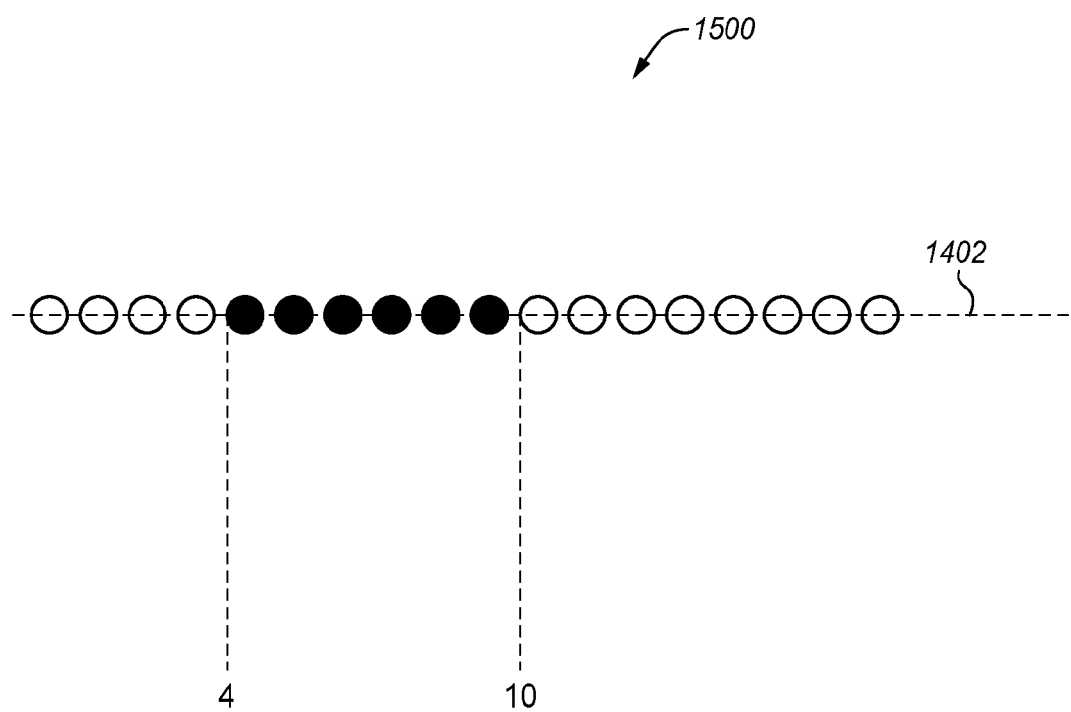
FIG. 15 illustrates a number of pixels along the vertical scan line of FIG. 14 in an exemplary embodiment.

FIG. 15 illustrates a number of pixels 1500 along vertical scan line 1402 in an exemplary embodiment. Pixels that are clear indicate that protectant 123 will not be applied to medium 124 at a particular nozzle 120 of protectant print head 116, and pixels that are dark indicate that protectant 123 will be applied to medium 124 at a particular nozzle 120 of protectant print head 116.

In FIG. 15, the transition points occur where pixels 1500 transition between clear and dark. In the run ends format, the sequence of transitions may be [4, 10] as illustrated in FIG. 15. However, additional numbers may be present in the sequence depending on the particular implementation of the run ends format.

In this embodiment, processor 104 can directly identify the transition points in scan line 1402 based on the sequence that indicates the vertical boundaries of the printable features in intermediate protectant bitmap 110 (see step 1304). For example, the number four in the sequence allows processor 104 to identify a run of four white pixels in scan line 1402, while the number ten in the sequence allows processor 104 to identify a subsequent run of six black pixels that follow the white run of four pixels.

Figure 16:
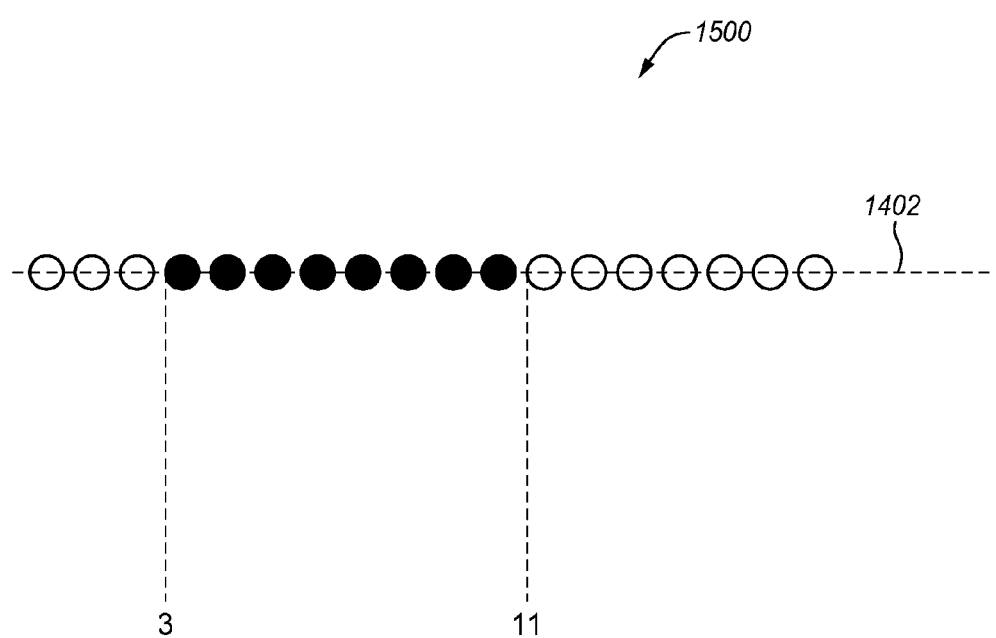
FIG. 16 illustrates how the sequence illustrated in FIG. 15 has been modified proximate to the transition points in an exemplary embodiment.

In response to identifying the transition points in the run ends sequence, processor 104 modifies the sequence proximate to the transition points to expand the vertical boundaries where the protectant 123 is applied to medium 124 (see step 1306). FIG. 16 illustrates how the sequence has been modified proximate to the transition points in an exemplary embodiment. In the run ends format, the modified sequence of transitions points is now [3, 11], corresponding to a one pixel expansion where protectant 123 will be applied to medium 124. Although FIG. 16 illustrates a 1 pixel expansion, any number may be expanded as desired to vary the amount of vertical expansion of intermediate protectant feature 402-A. For instance, processor 104 may be programmed to shift the transition points in the sequence by a pre-determined number of pixel locations (e.g., 10) to expand the boundaries where protectant 123 is applied to medium 124. In some embodiments, a user may utilize user interface 101 to select the pre-determined number of pixel locations for expansion. This allows the user to vary the vertical expansion as desired. If a two pixel expansion is desired, the sequence [4, 10] becomes [2, 12]. A three pixel expansion becomes [1, 13].

This process may be repeated for a number of vertical scan lines in bitmap 110. In response to modifying the rotated sequences for vertical expansion, processor 104 un-rotates the rotated sequences (see step 1308).

Figure 17:
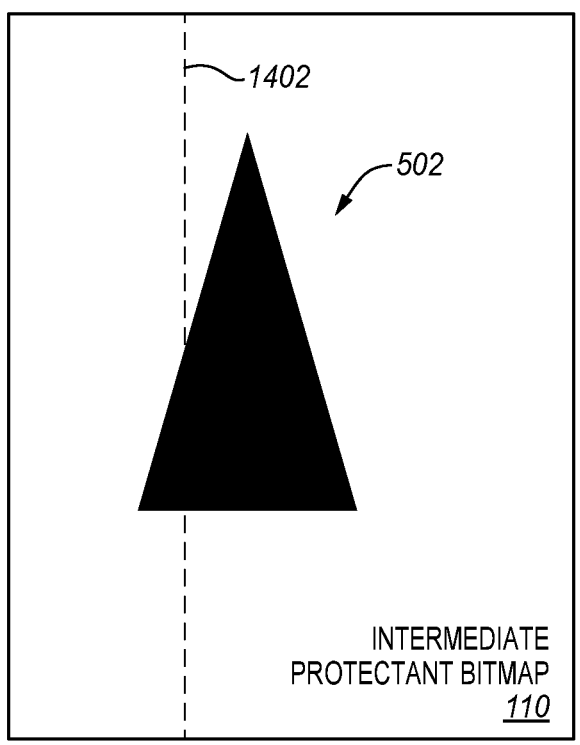
FIG. 17 illustrates a printable feature after both the horizontal scan line expansion and vertical scan line expansion in an exemplary embodiment.

FIG. 17 illustrates expanded protectant feature 502 after both the horizontal scan line expansion and vertical scan line expansion in an exemplary embodiment. After the vertical expansion is performed, the previously rotated run end sequences are un-rotated prior to directing protectant print head 116 to apply protectant 123 to the printable features formed on medium 124. For instance, another transpose operation may be performed on the rotated run ends sequences to un-rotate the sequences.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

In one embodiment, the invention is implemented in software, which includes but is not limited to firmware, resident software, microcode, etc. FIG. 18 illustrates a computing system 1800 in which a computer readable medium 1806 may provide instructions for performing any of the functionality disclosed herein for controller 102.

Furthermore, the invention can take the form of a computer program product accessible from computer readable medium 1806 that provides program code for use by or in connection with a processor or any instruction execution system. For the purposes of this description, computer readable medium 1806 can be any apparatus that can tangibly store the program for use by or in connection with the instruction execution system, apparatus, or device, including computer system 1800.

Computer readable medium 1806 can be any tangible electronic, magnetic, optical, electromagnetic, infrared, or semiconductor system (or apparatus or device). Examples of computer readable medium 1806 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

Computing system 1800, suitable for storing and/or executing program code, can include one or more processors 1802 coupled directly or indirectly to memory 1808 through a system bus 1810. Memory 1808 can include local memory employed during actual execution of the program code, bulk storage, and cache memories which provide temporary storage of at least some program code in order to reduce the number of times code is retrieved from bulk storage during execution. Input/output or I/O devices 1804 (including but not limited to keyboards, displays, pointing devices, etc.) can be coupled to the system either directly or through intervening I/O controllers. Network adapters may also be coupled to the system to enable computing system 1800 to become coupled to other data processing systems, such as through host systems interfaces 1812, or remote printers or storage devices through intervening private or public networks. Modems, cable modem and Ethernet cards are just a few of the currently available types of network adapters.

Although specific embodiments were described herein, the scope is not limited to those specific embodiments. Rather, the scope is defined by the following claims and any equivalents thereof.

The invention claimed is:

1. A system comprising:
a controller for a printing system configured to receive colorant bitmaps that define printable features for a medium, to calculate a colorant coverage for the medium based on the colorant bitmaps, and to replicate the printable features from the colorant bitmaps having a colorant coverage higher than a threshold to a first protectant bitmap to generate first protectant features, wherein the first protectant bitmap specifies a first amount of a clear protectant to apply to the medium;
the controller configured to replicate the printable features from the colorant bitmaps having a colorant coverage that is lower than the threshold to a second protectant bitmap to generate second protectant features, wherein the second protectant bitmap specifies a second amount of the clear protectant to apply to the medium that is different than the first amount;
the controller configured to expand boundaries of the first and second protectant features to generate expanded first and second protectant features, to replicate the expanded first and second protectant features to a final protectant bitmap, and to determine an amount of the clear protectant to specify for the expanded first protectant features in the final protectant bitmap that is based on the first and second amounts specified in the first and second protectant bitmaps;
the controller configured to direct print heads of the printing system to apply colorants to the medium to form the printable features on the medium based on the colorant bitmaps, and to direct a print head of the printing system to apply the clear protectant to the printable features formed on the medium based on the final protectant bitmap.

2. The system of claim 1, wherein:
the controller is configured to determine the amount of the clear protectant to specify in the final protectant bitmap for the expanded first protectant features that is based on a higher of the first and second amounts specified in the first and second protectant bitmaps.

3. The system of claim 1, wherein:
the controller is configured to determine the amount of the clear protectant to specify in the final protectant bitmap for the expanded first protectant features that is based on a lower of the first and second amounts specified in the first and second protectant bitmaps.

4. The system of claim 1, wherein:
the controller is configured to convert horizontal scan lines in the first and second protectant bitmaps into sequences of run ends, to identify first transition points in the sequences of run ends that indicate horizontal boundaries of the first and second protectant features, and to modify the sequences of run ends proximate to the first transition points to expand the horizontal boundaries where the clear protectant is applied to the medium.

5. The system of claim 4, wherein:
the controller is configured to rotate the sequences of run ends for processing vertical scan lines in the first and second protectant bitmaps, to identify second transition points in the rotated sequences of run ends that indicate vertical boundaries of the first and second protectant features, and to modify the rotated sequences of run ends proximate to the second transition points to expand the vertical boundaries where the clear protectant is applied to the medium.

6. The system of claim 5, wherein:
the controller is configured to un-rotate the rotated sequences of run ends prior to directing the print head to apply the clear protectant to the printable features formed on the medium.

7. The system of claim 1, wherein:
the first and second protectant bitmap comprises sequences of run ends; and
the controller is configured to identify the boundaries of the first and second protectant features that is based on transition points in the sequences of run ends.

8. The system of claim 7, wherein:
the controller is configured to shift the transition points in the sequences of run ends by a pre-determined number of pixel locations to expand the boundaries where the clear protectant is applied to the medium.

9. A method comprising:
receiving colorant bitmaps that define printable features for a medium;
calculating a colorant coverage for the medium based on the colorant bitmaps;
replicating the printable features from the colorant bitmaps having a colorant coverage higher than a threshold to a first protectant bitmap to generate first protectant features, wherein the first protectant bitmap specifies a first amount of the clear protectant to apply to the medium;
replicating the printable features from the colorant bitmaps having a colorant coverage that is lower than the threshold to a second protectant bitmap to generate second protectant features, wherein the second protectant bitmap specifies a second amount of a clear protectant to apply to the medium that is different than the first amount;
expanding boundaries of the first and second protectant features to generate expanded first and second protectant features;
replicating the expanded first and second protectant features to a final protectant bitmap;
determining an amount of the clear protectant to specify for the expanded first protectant features in the final protectant bitmap that is based on the first and second amounts specified in the first and second protectant bitmaps;
directing print heads of a printing system to apply colorants to the medium to form the printable features on the medium based on the colorant bitmaps; and
directing a print head of the printing system to apply the clear protectant to the medium to the printable features formed on the medium based on the final protectant bitmap.

10. The method of claim 9, wherein determining the amount further comprises:
determining the amount of the clear protectant to specify in the final protectant bitmap for the expanded first protectant features that is based on a higher of the first and second amounts specified in the first and second protectant bitmaps.

11. The method of claim 9, wherein determining the amount further comprises:
determining the amount of the clear protectant to specify in the final protectant bitmap for the expanded first protectant features that is based on a lower of the first and second amounts specified in the first and second protectant bitmaps.

12. The method of claim 9, wherein expanding the boundaries further comprises:
converting horizontal scan lines in the first and second protectant bitmaps into sequences of run ends;
identifying first transition points in the sequences of run ends that indicate horizontal boundaries of the first and second protectant features; and
modifying the sequences of run ends proximate to the first transition points to expand the horizontal boundaries where the clear protectant is applied to the medium.

13. The method of claim 12, wherein expanding the boundaries further comprises:
rotating the sequences of run ends for processing vertical scan lines in the first and second protectant bitmaps;
identifying second transition points in the rotated sequences of run ends that indicate vertical boundaries of the first and second protectant features; and
modifying the rotated sequences of run ends proximate to the second transition points to expand the vertical boundaries where the clear protectant is applied to the medium.

14. The method of claim 13, further comprising;
un-rotating the rotated sequences of run ends prior to directing the print head to apply the clear protectant to the printable features formed on the medium.

15. The method of claim 9, wherein:
the first and second protectant bitmaps comprise sequences of run ends; and
the method further comprises identifying the boundaries of the first and second protectant features that is based on transition points in the sequences of run ends.

16. The method of claim 15, further comprising:
shifting the transition points in the sequences of run ends by a pre-determined number of pixel locations to expand the boundaries where the clear protectant is applied to the medium.

17. A non-transitory computer readable medium embodying programmed instructions which, when executed by a processor of a printing system, direct the processor to:
receive colorant bitmaps that define printable features for a medium;
calculate a colorant coverage for the medium based on the colorant bitmaps;
replicate the printable features from the colorant bitmaps having a colorant coverage higher than a threshold to a first protectant bitmap to generate first protectant features, wherein the first protectant bitmap specifies a first amount of the clear protectant to apply to the medium;
replicate the printable features from the colorant bitmaps having a colorant coverage that is lower than the threshold to a second protectant bitmap to generate second protectant features, wherein the second protectant bitmap specifies a second amount of a clear protectant to apply to the medium that is different than the first amount;
expand boundaries of the first and second protectant features in the first and second protectant bitmaps where the clear protectant is applied to the medium to generate expanded first and second protectant features;
replicate the expanded first and second protectant features to a final protectant bitmap;
determine an amount of the clear protectant to specify in the final protectant bitmap for the expanded first protectant feature that is based on the first and second amounts specified in the first and second protectant bitmaps;
direct print heads of the printing system to apply colorants to the medium to form the printable features on the medium based on the colorant bitmaps; and
direct a print head of the printing system to apply the clear protectant to the printable features formed on the medium based on the final protectant bitmap.

18. The non-transitory computer readable medium of claim 17, wherein the programmed instructions further direct the processor to:
determine the amount of the clear protectant to specify in the final protectant bitmap for the expanded first protectant feature that is based on a higher of the first and second amounts specified in the first and second protectant bitmaps.

19. The non-transitory computer readable medium of claim 17, wherein the programmed instructions further direct the processor to:
determine the amount of the clear protectant to specify in the final protectant bitmap for the expanded first protectant bitmap that is based on a lower of the first and second amounts specified in the first and second protectant bitmaps.

20. The non-transitory computer readable medium of claim 17, wherein:
the first and second protectant bitmaps comprises sequences of run ends; and
the programmed instructions further direct the processor to identify the boundaries of the first and second protectant features that is based on transition points in the sequences of run ends.

* * * * *